United States Patent Office 3,409,136
Patented Nov. 5, 1968

3,409,136
SEPARATION PLATE FOR THIN-LAYER
CHROMATOGRAPHY
Jan Simonides, Vit Nadvornik, and Jiri Pliml, Prague, Czechoslovakia, assignors to Ceskoslovenska akademie ved, Prague, Czechoslovakia
No Drawing. Filed July 6, 1967, Ser. No. 651,395
Claims priority, application Czechoslovakia, July 7, 1966, 4,599/66; July 28, 1966, 5,076/66; Dec. 23, 1966, 8,267/66; Jan. 31, 1967, 736/67
8 Claims. (Cl. 210—198)

ABSTRACT OF THE DISCLOSURE

The plate-shaped carrier of an otherwise conventional separation plate for thin-layer chromatography includes a non-metallic base layer of cardboard, plastic, fiberboard, or fabric, and a much thinner metal foil, preferably aluminum or tin, superimposed on at least one face of the base layer and fixedly attached thereto. The thin layer of static phase of the plate is separated from the base layer by the metal foil.

BACKGROUND OF THE INVENTION

This invention relates to separation plates for thin-layer chromatography and particularly to an improved carrier for the thin layer of static phase.

Glass plates are widely employed as carriers for the thin active layer of separation plates for thin-layer chromatography, and were until recently exclusively used. They are transparent and the detection of a faint spot on a transparent carrier is more difficult than on an opaque carrier and particularly on a carrier of opaque reflecting material. Glass plates, moreover, are fragile and relatively thick and bulky when of reasonable strength. They are somewhat difficult to handle and to store for this reason.

It has been proposed in French Patent 1,370,780 to replace glass as a carrier by polyethylene terephtalate foils which are virtually unbreakable even when very thin. Yet, such foils are transparent or at least highly translucent and do not facilitate the discovery of faint spots in the superimposed layer of static phase.

It has also been proposed to use aluminum foil or sheet as a carrier (F. Snyder, Anal. Chem. 35, 599, 1963, and others) because the aluminum layer can be made thinner than a glass plate of equal or inferior strength and has desirable reflecting properties. However, aluminum foil or sheet of adequate thickness is relatively stiff so that permanent creases are formed when the material is bent or otherwise deformed during handling. Such creases seriously interfere with the reading of a chromatogram.

The object of the invention is the provision of a separation plate having an improved carrier free from the shortcomings of glass and of other carrier materials known heretofore.

SUMMARY OF THE INVENTION

According to this invention, the carrier of a separation plate has a base layer of non-metallic material and a metal foil superimposed on one major face of the base layer and fixedly attached to the same. The metal foil which is interposed between the base layer and the thin layer of static phase to carry the latter a thickness substantially smaller than that of the base layer, and small enough to permit flexing of the metal foil without creasing.

Cardboard, and especially unsized cardboard 0.2 to 0.5 mm. thick, is a very economical material for the base layer, and aluminum and tin are the preferred metals for the limp and pliable foil. When the plate is to be developed by immersion in an aqueous liquid, it is preferred to impregnate or to coat the cardboard layer with a water-repelling agent. An adhesive mainly consisting of starch and a water-repelling agent when set is preferred for securing the metal foil to the cardboard. The latter may be further protected against the effects of developing agents by covering its second face with another fixedly attached metal foil which, however, does not carry a layer of static phase.

Cardboard essentially consists of interengaged cellulose fibers, but interengaged fibers of materials other than cellulose may be substituted. The interengaged natural or synthetic fibers may constitute a woven, knitted, or non-woven fabric. Synthetic fibers generally absorb little water, if any, but a water-repelling agent is used on a base layer which is a fabric of natural fibers, more specifically of cotton fibers.

Other features, additional objects, and many of the attendant advantages of this invention will be readily apparent from consideration of the following description of preferred embodiments.

DESCRIPTION OF PREFERRED EMBODIMENTS

Example 1

Unsized cardboard, 0.35 mm. thick, and an aluminum foil, 0.01 mm. thick, were attached to each other face to face by means of an adhesive mainly consisting of a dispersion of potato starch in water. The cardboard and metal foil were held in contact with each other in a press until the adhesive had set. The exposed reflecting face of the aluminum foil was then coated with a thin layer of silica gel containing plaster of Paris as a binder in a conventional manner more fully described in "The Laboratory Handbook of Chromatographic Methods," O. Mikes, Chief Editor (D. Van Nostrand Co., Princeton, N.J.), pages 232–245.

In a modification of this method, pieces of the same metal foil were adhesively attached to both faces of the cardboard and held under pressure until the adhesive had set. Only one foil, however, was coated with a thin layer of static phase.

Example 2

Cardboard, unsized and approximately 0.45 mm. thick, was continuously drawn from a supply roll, passed through a 1% solution of a commercial methylpolysiloxane resin composition in toluene, and then dried at 100° C.

The cardboard was made water-repellant by immersion treatment. It was attached to an aluminum foil 0.01 mm. thick under pressure by means of a starch-based adhesive, as described in Example 1, the starch dispersion containing 0.5% of a commercial aqueous methylsilicone oil suspension to make the adhesive layer water-repellant.

The separation plates prepared from pieces of carrier cut from the roll of laminate so obtained could be immersed in aqueous liquids for an extended period without significant loss of strength or swelling of the cardboard base. Even greater resistance to moisture was achieved when both faces of the cardboard were covered with aluminum foil.

A product having closely similar properties was obtained when both faces of the cardboard were sprayed with the aforementioned aqueous methylsilicone oil suspension, and the cardboard was dried thereafter at 110° to 130° C.

Supple tin foil was substituted for the aluminum foil without other changes in procedure. The thickness of the foil is not critical, as long as it is small enough to permit normal deformation of the separation plate and the corresponding flexing of the metal layer without forming permanent creases in the latter. The strength of the plate is derived almost exclusively from the much thicker base layer which is cardboard in the preceding examples, but need not be cardboard, as will presently become apparent. The metal foil provides a liquid-tight barrier between the thin layer of static phase and the cardboard and protects the latter against chemical attack by processing fluids applied to the static phase. It also provides an opaque and at least somewhat reflecting background for the static phase which is beneficial for the reasons explained above. Aluminum foil and particularly tin foil meet these requirements when extremely thin and substantially thinner than the 0.01 mm. foil which is preferred at this time for convenience in handling.

Separation plates for thin-layer chromatography which are stronger at equal thickness or thinner at equal strength than those made from cardboard are prepared from polyethylene terephthalate foil. The plastic foil was coated with a thin layer of catalyzed commercial epoxy adhesive and then attached to aluminum foil under slight pressure. Polyethylene terephthalate foil as thin as 0.1 mm. was successfully employed.

Sheets and foils of polyethylene, polyvinyl chloride, polytetrafluoroethylene have been laminated with thinner aluminum and tin foils and employed as carriers in separation plates. We have also adhesively bonded woven, knitted, and non-woven fabrics of cotton, glass fibers, polyamide, and polyester fibers to aluminum and tin foils, and have used the carriers so produced in separation plates. Cotton fabric was made water-repellent by means of silicone oil suspensions and was attached to the metal foil by a starch adhesive containing the same water-repelling agent. Other adhesives, such as epoxides and water glass, may also be used. When starch or water glass is employed for attaching cotton fabric or fabrics of other natural fibers to metal, the adhesive also should contain a water repellent.

The separation plates of the invention do not require significant modifications in conventional chromatographic techniques. Their carriers are rigid enough to permit development in ordinary equipment. Apparatus commonly employed with glass plates may be used for ascending development. Paper chromatography equipment may be used for descending development. For the latter purpose, cardboard base layers only 0.2 to 0.3 mm. thick are preferred. Cardboard is also preferred over foils or sheets of the aforementioned thermoplastic synthetic resin materials when the thin layer of static phase is to be activated at elevated temperatures.

A thickness of the non-metallic base layer greater than 0.5 mm. is normally not necessary, and neither the superimposed metal foil nor the thin layer of static phase add materially to the thickness of the deposition plate. Plates prepared with the carriers of this invention are extremely thin, insensitive to shock, and therefore easy to handle and to store.

It should be understood, of course, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

We claim:
1. In a separation plate for thin-layer chromatography having a plate-shaped carrier and a thin layer of a static phase on one face of said carrier, the improvement in the carrier which comprises:
   (a) a base layer of non-metallic material having two major faces; and
   (b) a metal foil superimposed on one of said faces and fixed attached thereto,
       (1) said metal foil being interposed between said base layer and said thin layer of static phase to carry said thin layer,
       (2) the thickness of said metal foil being substantially smaller than the thickness of said base layer and small enough to permit flexing of said metal foil without permanent creasing.
2. In a plate as set forth in claim 1, said base layer essentially consisting of unsized cardboard 0.2 to 0.5 millimeter thick, and said metal being aluminum or tin.
3. In a plate as set forth in claim 2, an effective amount of a water-repelling agent in said base layer.
4. In a plate as set forth in claim 3, a layer of adhesive material interposed between said base layer and said foil, said layer essentially consisting of starch and a water-repelling agent.
5. In a plate as set forth in claim 1, a second metal foil superimposed on the other of said faces and fixedly attached thereto.
6. In a plate as set forth in claim 1, said base layer essentially consisting of a plastic foil.
7. In a plate as set forth in claim 1, said base layer essentially consisting of interengaged fibers.
8. In a plate as set forth in claim 1, said base layer essentially consisting of a fabric of natural fibers and an effective amount of a water-repelling agent.

References Cited

UNITED STATES PATENTS

| 2,678,132 | 5/1954 | Beard | 210—198 X |
| 3,067,132 | 12/1962 | Gunew | 210—198 X |
| 3,189,541 | 6/1965 | Brenner et al. | 210—198 X |

REUBEN FRIEDMAN, *Primary Examiner.*

J. D. DE CESARE, *Assistant Examiner.*